United States Patent [19]

Kilby

[11] 3,784,721

[45] Jan. 8, 1974

[54] SYSTEM FOR SCREENING TELEPHONE CALLS

[76] Inventor: Jack S. Kilby, 7723 Midburg, Dallas, Tex. 75230

[22] Filed: Nov. 22, 1971

[21] Appl. No.: 200,804

[52] U.S. Cl. ............... 179/6 R, 179/6 E, 179/84 C, 179/89

[51] Int. Cl. ............................................ H04m 1/64

[58] Field of Search ................. 179/6 R, 6 AC, 6 C, 179/6 E, 89, 84 C, 2 A

[56] References Cited

UNITED STATES PATENTS

| | | | |
|---|---|---|---|
| 3,187,108 | 6/1965 | Cliw et al. | 179/84 C |
| 3,226,489 | 12/1965 | Grambsch | 179/89 |
| 2,715,161 | 8/1955 | Lutz et al. | 179/84 C |
| 3,514,548 | 5/1970 | De Meo | 179/84 C |
| 3,033,941 | 5/1962 | Bell et al. | 179/89 |
| 3,064,085 | 11/1962 | Muramatsu | 179/89 |
| 3,445,600 | 5/1969 | Todd | 179/6 R |
| 3,501,592 | 3/1970 | Waldman | 179/6 R |

*Primary Examiner*—Raymond F. Cardillo, Jr.
*Attorney*—Harold Levine et al.

[57] ABSTRACT

A system for screening telephone calls is described which intercepts an incoming ring signal to prevent disturbing the called party. The system produces an off-hook condition and responds with a recorded announcement specifying the activity in which the called party is involved and indicating that he would prefer not to be interrupted, and also gives instructions as to how the calling party may nevertheless continue the call by initiating an additional dialed signal if he wishes. When the calling party initiates the additional signal identified by the instruction, such as by dialing one or more digits, or when an additional prearranged signal is transmitted, the called party is summoned to the telephone. As an alternative to interrupting the called party, the calling party may record a message. The recorded announcement may be modified by the subscriber at any time to tailor the announcement to the occasion to enable the calling party to better use his judgment as to when to interrupt. Other telephone answering functions are also described.

15 Claims, 4 Drawing Figures

PATENTED JAN 8 1974

3,784,721

SHEET 1 OF 3

FIG. I

SYSTEM FOR SCREENING TELEPHONE CALLS

This invention relates generally to telephone systems, and more particularly relates to devices adapted to be connected to a local subscriber's telephone line for responding to incoming telephone calls.

A large number of devices have heretofore been proposed for automatically answering a telephone, responding with an announcement, and then recording a message. These devices have almost exclusively been concerned with answering the telephone automatically in the absence of the called party.

In an office, a major function of a secretary is often to screen incoming calls, permitting an executive to participate in a conference or work undisturbed, secure with the knowledge that he will be informed of important calls. In the home, or in offices where no secretaries are utilized, people are literally slaves to the telephone. When the telephone rings, all other activities must be interrupted while the telephone is answered. A telephone salesman or solicitor receives the same response as a caller with an emergency message. The telephone is the only appliance in the home without an on-off switch, but because of the possibility of emergency calls, such a switch cannot be used safely. However, most people will respect the wishes of the person they are calling if they know the person does not want to be disturbed, except when the call is important, such as in an emergency situation.

This invention is concerned with a system for intercepting, at the option of the telephone subscriber, an incoming ring signal by establishing an off-hook condition, and responding with a recorded announcement indicating that the called party would prefer not to be disturbed. Based on the content of the announcement, the calling party may then use his discretion as to whether to interrupt the called party by initiating an additional signal, which is detected by the system and used to summon the called party. The announcement may indicate the activity in which the called party is engaged, so as to assist the calling party in exercising his discretion. The recorded announcement may also provide instructions as to how to summon the called party in the event the calling party wishes to complete the call. The additional signal is preferably one or more dialed digits, but may be a spoken word, or any other signal which may be transmitted over the telephone lines and detected at the receiving station. The system may also provide means for recording a message from the calling party to the called party as an alternative to dialing the additional digits to summon the called party.

The novel features believed characteristic of this invention are set forth in the appended claims. The invention itself, however, as well as other objects and advantages thereof, may best be understood by reference to the following detailed description of illustrated embodiments, read in conjunction with the accompanying drawings:

Figure 1:
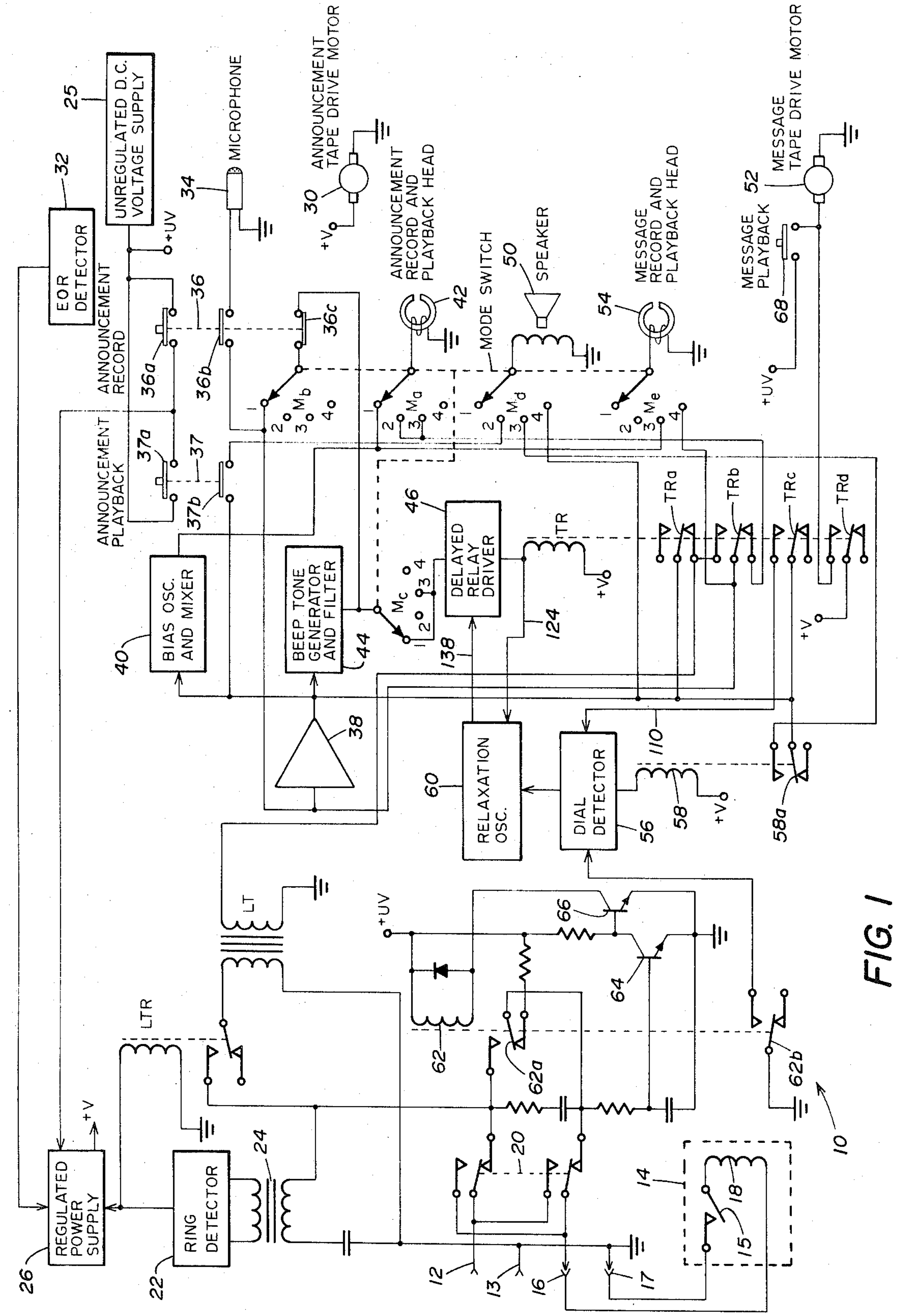
FIG. 1 is a schematic diagram of a system in accordance with the present invention.

Referring now to the drawings, a system in accordance with the present invention is indicated generally by the reference numeral 10. The system 10 is connected in series with the subscriber's telephone set by connecting the incoming telephone lines to connectors 12 and 13 and connecting the subscriber's telephone set 14 to connectors 16 and 17. Only the cradle switch 15 and the secondary 18 of the line transformer of the set 14 are illustrated. The switch 15 is open when the hand set is on the hook, and closed when the hand set is lifted from the cradle by the called party, which is the off-hook condition.

The system 10 includes a double-pole, double-throw "on-off" switch 20 which is illustrated in the "on" position. When the switch 20 is thrown upwardly, the telephone set 14 is connected directly to the lines 12 and 13 and the device 10 is "off."

The system 10 has four separate modes of operation which may be selected by a four-position mode switch. The mode switch M has five separate wiper arms $M_a$–$M_e$ which are moved simultaneously by a single control knob. When the wipers $M_a$–$M_e$ are in position on the number 1 contacts, which is the position illustrated, the system is in the "Announcement Record" mode. When the wipers are positioned on contacts number 2, the system is in the "Announcement Playback" mode; when on contacts number 3, the "Automatic Answer" mode, and when on contacts number 4, the "Message Playback" mode.

The system 10 uses two separate magnetic tapes (not illustrated). One tape, referred to as an announcement tape, is used to store an announcement to be played to a calling party. The other tape, referred to as a message tape, is used to record any message the calling party may wish to leave. An amplifier 38 of conventional design is active in all modes of operation as will hereafter be described. A bias oscillator and mixer 40 is connected to the output of the amplifier 38 and is used in the conventional manner for recording upon either the announcement tape or the message tape.

The announcement tape is operated by an announcement tape drive motor 30, and announcements are recorded on the tape and reproduced from the tape by an announcement record and playback head 42. The announcement tape is an endless tape having a suitable "end of record" indicator, such as a metallic strip, for purposes which will presently be described. A microphone 34 is used to input audio signals to the device 10 for recording announcements as will hereafter be described.

The message tape may be a conventional cassette tape, and is operated by a message tape drive motor 52. Messages may be recorded upon and reproduced from the message tape by a message record and playback head 54.

A speaker 50 is used to output any audio signal from the device 10, including the playback of announcements and messages, and to summons the subscriber to the phone when operating in the automatic mode, all of which will hereafter be described in detail.

An Announcement Record switch 36 has contacts *36a*, *36b* and *36c*. When the push-button type switch 36 is depressed, contact *36a* connects an unregulated voltage supply 25 to a regulated power supply 26. This energizes the regulated power supply 26 which starts the announcement tape drive motor 30. Contact *36b* connects the microphone 34 to the input of the amplifier 38. Normally closed contact *36c* disconnects the output of a beep-tone generator and filter 44 from the input of the amplifier 38.

An announcement playback switch 37 has normally open contacts 37*a* and 37*b*. When the announcement playback switch 37 is depressed, contact 37*a* connects the unregulated voltage supply to the regulated power supply 26 to energize the regulated power supply 26 and thus cause the announcement tape drive motor 30 to operate. Contact 37*b* connects the output of amplifier 38 to contact number 2 of the mode switch $M_d$.

As mentioned, the endless magnetic announcement tape (not illustrated) is driven by announcement drive motor 30 whenever the regulated power supply is energized. As soon as the announcement tape is moved in response to the regulated power supply being energized, the end of record detector 32 maintains the power supply 26 energized until the endless tape has made one complete revolution and the end of tape is again detected. Then the regulated power supply is turned off to deactivate the device 10. Thus, the device 10 can be active only for the period of time required for the endless announcement tape to make one complete cycle, which limits the length of time that the unit can summons the called party to the telephone, or limits the length of any message which can be recorded by the calling party, as will hereafter be described.

A ring detector circuit 22 is coupled to the telephone lines 12 and 13 by way of transformer 24. Upon receiving a ring signal, the ring detector 22 energizes a line transformer relay LTR and also energizes the regulated power supply 26 to start operation of the announcment tape drive motor 30. When relay LTR is energized, line transformer LT is connected across the telephone lines 12 and 13. The output of the amplifier 38 is also connected to a beep-tone generator and filter circuit 44. The circuit 44 has two modes of operation. In the first mode, the circuit 44 is connected in a loop with the amplifier to generate a beep-tone which is recorded on the announcement tape. In the second mode, the circuit detects the beep-tone reproduced from the announcement tape by the head 42 and the amplifier 38, and operates a delayed relay driver 46. The delayed relay driver 46 energizes the transmit-receive relay TR which has contacts TR*a*–TR*d*, which are illustrated in the normal or de-energized position, which is the transmit condition. The delayed relay driver 46 actuates relay TR after approximately one second.

A dial detector circuit 56 is provided to detect a signal transmitted by the calling party in response to the announcement. For example, the dial detector 56 may detect when the digit nine is dialed. The dial detector actuates a relay 58 having a single normally open pair of contacts 58a. The dial detector 56 also enables a relaxation oscillator 60 until such time as the dial detector 56 is disabled by contact 62*b* of relay 62 which will presently be described.

The relaxation oscillator 60 is connected in a loop with the delayed relay driver 46 so as to cause the relay driver 46 to operate relay TR in approximately one second "on" and one second "off" intervals to produce an interrupted beep-tone which is broadcast by speaker 50 to summons the called party to the telephone as will presently be described.

Figure 2:
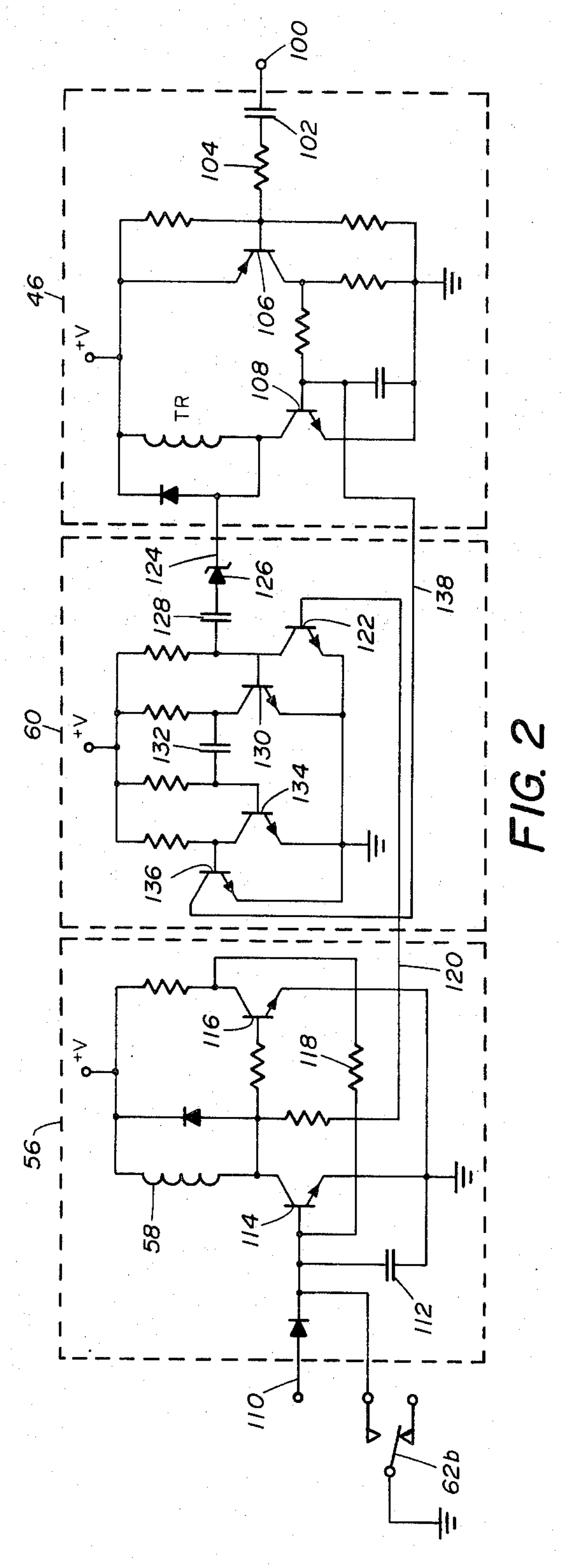
FIG. 2 is a detailed schematic diagram of a portion of the system illustrated in FIG. 1.

The delayed relay driver 46, the dial detector 56, and the relaxation oscillator 60 are shown in detail in FIG. 2. The output from the beep-tone generator and filter 44 is coupled by way of either mode switch contacts MC–1 or MC–3 to the input 100 of the delayed relay driver 46. The beep-tone signal is passed through a capacitor 102 and resistor 104 and turns transistor 106 "on." The collector of transistor 106 is coupled to the base of transistor 108, which controls relay TR. Relay TR is energized approximately one second after a beep-tone is applied to input 100.

The input 110 of the dial detector 56 is connected through contacts TRc to the output of the amplifier 38 when relay TR is energized. When an additional signal, such as the pulses produced by dialing the digit nine, is transmitted by the calling party, the pulses are integrated by capacitor 112 and transistor 114 is turned "on," thus energizing relay 58. Transistor 116 is also turned on, which latches transistor 114 in the "on" condition as a result of the feedback loop 118 to maintain a low voltage on output 120 until contacts 62*b* are closed as hereafter described to short the base of transistor 114 to ground. The output 120 of the dial detector 56 is connected to the base of transistor 122. When transistor 114 is off, transistor 122 is on and the relaxation oscillator 60 is disabled. However, when transistor 114 is turned on, transistor 122 is turned off to enable the oscillator 60. The output from the delayed relay driver 46 is coupled by line 124 through a Zener diode 126 and capacitor 128 to the base of transistor 120. The collector of transistor 130 is coupled by capacitor 132 to the base of transistor 134, the collector of which is in turn connected to the base of transistor 136. Transistor 136 is coupled by line 138 to the base of transistor 108 of the delayed relay driver 46 so that transistor 108 is turned off approximately 1 second after it is turned on by the beep-tone. The operation of the circuit illustrated in FIG. 2 is hereafter described in greater detail in connection with the overall operation of the system 10.

The relay 62 is energized when the switch 15 of the telephone set 14 is closed as a result of the receiver being lifted from the hook. It will be noted that when switch 15 is closed, transistor 64 is turned off and transistor 66 turned on to energize relay 62. Relay 62 has contacts 62*a* and 62*b*. When relay 62 is energized, contact 62*a* moves upwardly to connect the telephone set 14 to the telephone lines 12 and 13. Contact 62*b* grounds the dial detector 56 to reset it to the inactive condition.

The message tape drive motor is connected to the regulated power supply whenever relay TR is energized, and is thus in the receive mode, by contacts TR*d*. The message tape drive motor 52 may also be energized by the message playback switch 68.

The portions of the circuit not illustrated in detail are of conventional design, and are exemplified by the "Ansaphone 540" manufactured by Dictaphone.

OPERATION

In the operation of the system 10, assume first that an announcement is to be recorded on the announcement tape. The system 10 is placed in the Announcement Record mode by rotating the mode switch so that the wipers $M_a$–$M_e$ are positioned on contacts number 1. Mode switch contacts Ma-1 then connects the announcement record and playback head 42 to the output of the bias oscillator and mixer 40. The microphone 34 is connectable through the normally opened contact 36*b* of the announcement record switch 36 to the input of the amplifier 38. The output from the beep-tone generator and filter 44 is connected through normally closed contacts 36*c* to the input of the amplifier 38.

Thus, when the announcement record button 36 is depressed, contact 36*a* connects the unregulated voltage supply +*UV* to the regulated power supply 26 and powers up the circuit by energizing line +*V*. This immediately starts the announcement tape drive motor in operation. As soon as the endless tape has moved from the end of record position, the EOR detector 32 keeps the regulated power supply 26 operating until the announcement tape has gone through a complete cycle and the end of the endless tape is again detected by detector 32. The message spoken into the microphone 34 is then applied through contact 36*b* to the input of amplifier 38 and through the bias oscillator and mixer 40 to the announcement record and playback head 42 by way of mode switch contacts Ma–1. Contacts 36*c* of the announcement record button interrupts the loop from the beep-tone generator and filter 44 back to the input of the amplifier 38. A typical message to be recorded on the announcement might be:

"Mr. Kilby is in conference. If you wish to interrupt him, you may do so by dialing nine. If not, please leave your name and phone number after the tone and he will return your call later."

After the message is recorded, the announcement record button 36 is released. This disconnects the microphone from the input of the amplifier 38 and closes the loop from the output of the beep-tone generator and filter back to the input of the amplifier 38 so that a beep-tone is generated at the output of the amplifier. Although contact 36*a* is again open, it will be recalled that the end of record detector 32 keeps the regulated power supply 26 energized until such time as the end of record is again detected. When the end of the tape is detected, the power supply 26, and thus announcement tape drive motor 30, is deenergized. As a result, the beep-tone is recorded on the remainder of the announcement tape.

The announcement recorded on the announcement tape may be played back when the mode switch is in position at the number 2 contacts by merely pressing the announcement playback push-button 37. With the mode switch in position number 2, the announcement record and playback head 42 is connected by way of contact M*a*–2 and contact TR*b* to the input of the amplifier 38. The output of amplifier 38 is then connectable table by way of push-button contact 37*b* and mode switch contact Md–2 to the speaker 50. Thus, when the announcement playback push-button 37 is depressed, the regulated power supply 26 is activated which in turn energizes the announcement tape drive motor. The signal reproduced by the announcement record and playback head 42 is applied to the input of the amplifier 38, and the output of the amplifier is connected to the speaker 50. After the announcement has been played back, the push-button 37 may be released to disconnect the speaker from the output of the amplifier so that the beep-tone is not reproduced. However, the announcement tape drive motor 30 will continue to operate until the EOR detector 32 detects the starting point of the endless announcement tape.

Figure 3:
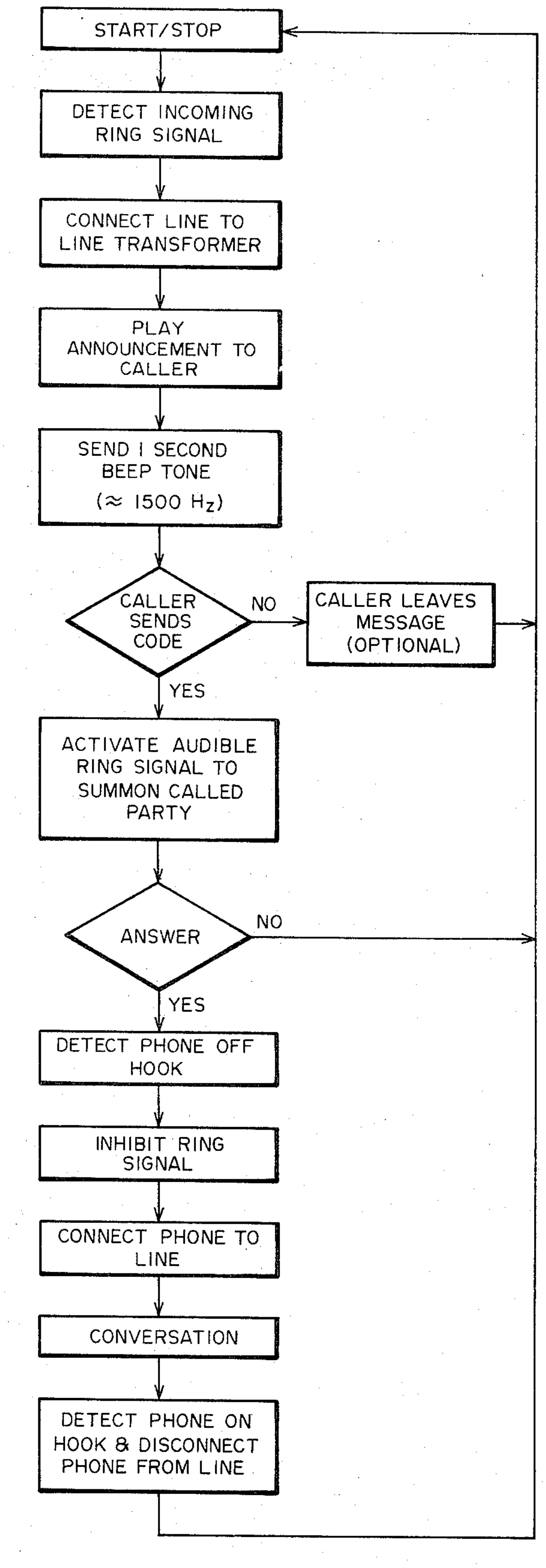
FIG. 3 is a flow diagram which serves to illustrate the sequence of operation of the system of FIG. 1.

The Automatic Answer mode is selected by moving the mode switch wipers to contacts number 3. The operation of the system 10 in the automatic answering mode is illustrated by the diagram in FIG. 3. An incoming ring signal is detected to start the sequence. Next the line transformer LT is connected to the telephone line, which simulates lifting the handset from the cradle. The recorded announcement is then played over the line to the calling party. This is followed by a one-second beep-tone indicating that the announcement has terminated. The calling party then decides if he wishes to interrupt the called party. If so, he dials a digit such as nine which activates a signal audible to the called party. When the called party lifts the handset from the cradle, the off-hook condition is detected and the audible signal terminated. After the conversation and the handset is returned to the cradle, the on-hook condition is detected and the set disconnected from the line. If the calling party elects not to interrupt the called party, he may, at his option, leave a message. The cycle then returns to start condition.

In the Automatic Mode, relay 62 is initially deenergized so that contacts 62*a* disconnect the telephone set 14 from the telephone lines 12 and 13. However, the telephone lines 12 and 13 are connected across the primary of transformer 24. When a ring signal comes in on lines 12 and 13, the ring detector 22 activates the regulated power supply 26 and also energizes the line transformer relay LTR. Relay LTR then connects the line transformer LT across the telephone lines 12 and 13.

When the regulated power supply 26 is activated by the ring detector 22, the announcement tape drive motor 30 is immediately energized. As soon as the announcement tape has moved the end of record detector 32 maintains the regulated power supply 26 operative. The announcement recorded on the announcement tape is then reproduced by the announcement record and playback head 42, and directed through mode switch contacts Ma–3 and contact TRb to input of amplifier 38. The output of amplifier 38 is connected by way of contact TR*a* to the line transformer LT so that the announcement is transmitted to the calling party. Upon completion of the announcement, the beep-tone recorded on the announcement tape is detected by the filter function of the beep-tone generator and filter 44 and activates the delayed relay driver 46. After transmitting the recorded beep to the calling party for approximately 1 second, the transmit receive relay TR is energized by the delayed relay driver 46 and switches to the receive condition.

In the receive condition, the line transformer is coupled through contacts TR*b* to the input of amplifier 38. The output of amplifier 38 is coupled through contacts TRc to the input of the dial detector 56. The output of the bias oscillator and mixer is also connected by way of mode switch contact ME–3 to the message record and playback head 54, and the message drive motor 52 is connected to the regulated power supply 26 of contacts TR*d*. As a result, the calling party has the option of either dialing the specified digit nine to speak with the called party or may record a message.

Assume that the calling party wishes to interrupt the called party. In that case, the digit nine is dialed and is transmitted by way of line transformer LT, contacts TR*a*, amplifier 38 and contacts TR*c* to the dial detector 56. When the calling party dials the digit nine, ten pulses are transmitted over the telepone lines, through the line transformer LT and the amplifier 38 to the input 110 of the dial detector 56 shown in FIG. 2. These pulses are integrated by the capacitor 112 and cause transistor 114 to switch on, thus energizing relay 58 which closes contacts 58*a* to couple contacts Md–4 and the speaker to contacts TR*c*. At the same time, transistor 116 is switched off so that transistor 114 is latched in the on condition.

When transistor 114 is latched in the on condition transistor 122 of the relaxation oscillator 60 is turned off, thus enabling the relaxation oscillator 60. When the dialed digit nine was detected, relay TR was energized and therefore is in the receive condition. However, when transistor 122 is turned off, transistor 130 is turned on, transistor 134 is turned off and transistor 136 is turned on so that transistor 108 is turned off. This causes relay TR to switch from the receive condition to the transmit condition. Since the announcement tape drive motor 30 is continuing to operate, the beep-tone previously recorded on the announcement tape is again reproduced by the announcement record playback head 42 and transferred through contact TR*b* to the amplifier 38. The output of amplifier 38 is connected through contacts 58A, TR*c* and MD3 to speaker 50 so that the beep-tone is broadcast to the called party. At the same time, the reproduced beep-tone is again detected by the beep-tone generator and filter 44, which signal is applied to input 100 and again switches transistor 108 on after about 1 second and return relay TR to the receive condition so that the beep-tone is not broadcast over the speaker 50. When transistor 108 is turned off, the transition at the collector is coupled through diode 126 and capacitor 128 to turn transistor 130 on. This signal ripples through the relaxation oscillator 60 and turns transistor 108 off after about one second. This repeats the cycle. As a result, the beep-tone previously recorded on the announcement tape is broadcast by the speaker 50 at intervals of approximately 1 second on and 1 second "off". The interrupted beep-tone continues until the called party lifts the receiver from the hook to close switch 15, or until the end of record detector 32 detects the end of the endless announcement tape and disables the regulated power supply 26 to power down the device 10.

If the called party lifts the receiver from the hook of the telephone set 14 to close contact 15, relay 62 will be energized when transistor 66 is switched on. In such a case, contacts 62*a* connect the telephone set 14 to the telephone lines 12 and 13 and the conversation may be conducted in the normal manner. When contacts 62*b* close the dial detectors 56 is reset by turning transistor 114 off, which in turn disables the relaxation oscillator 60 by turning transistor 122 on, and terminates the broadcast of the interrupted beep-tone by the speaker 50. The announcement tape drive motor 30 continues, however, to drive the tape until the end of record detector 32 detects the end of the tape and disables the regulated power supply 26.

If on the other hand, the calling party elects to leave a message, he may do so because the line transformer LT is connected to the input of the amplifier 38 by way of contacts TR*b*. The output of the bias oscillator and mixer 40 is connected to the message record and playback head 54 by mode switch contacts ME–3. As previously mentioned, the message tape drive motor 52 is operated whenever transmit receive relay TR is in the receive condition by way of contact TR*d*.

Messages recorded on the message tape may be played back by switching the mode selector switch to contacts number 4 and depressing the message playback button 68. With the mode selector switch at contacts number 4, the message record and playback head 54 is connected by way of mode switch contact M*e*–4 to the input of amplifier 38. The output of amplifier 38 is connected by way of mode switch contact M*d*–4 to the speaker 50. When the message playback button 68 is depressed, the message tape drive motor 54 is operated directly from the unregulated voltage supply.

Figure 4:
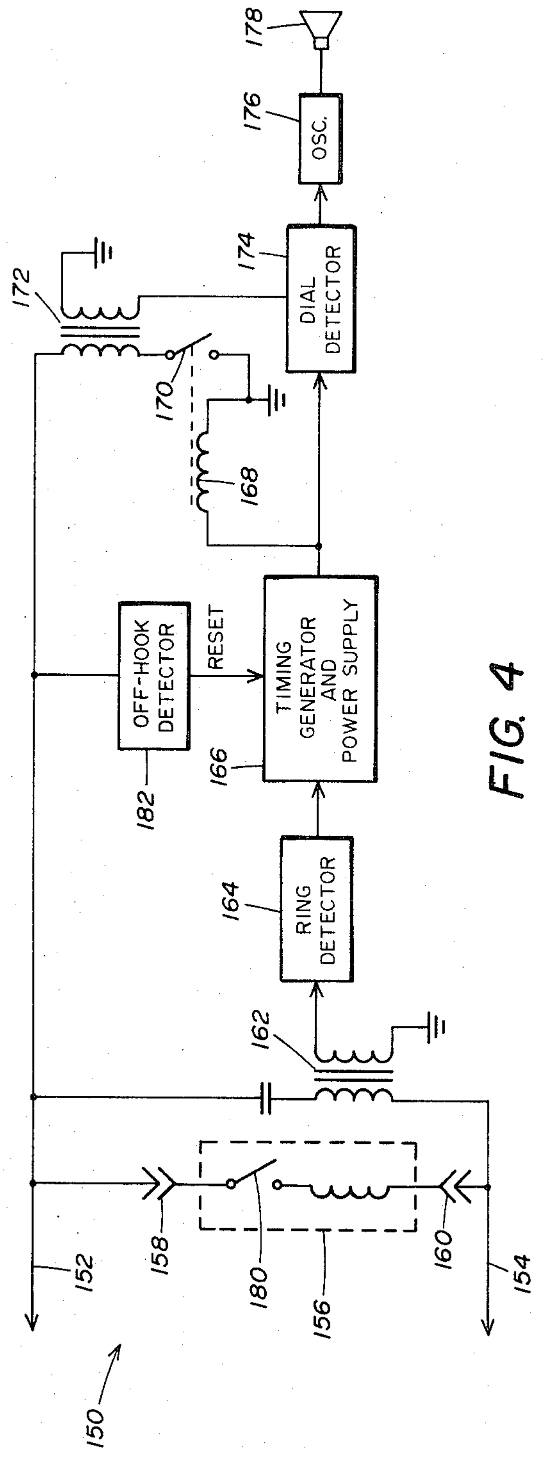
FIG. 4 is a schematic block diagram of an alternative embodiment of the present invention.

Another embodiment of the invention is indicated generally by the reference numeral 150 in FIG. 4. The system 150 is connected to the telephone lines by couplings 152 and 154. The telephone handset 156 is connected to the system 150 by couplings 158 and 160. A first transformer 162 couples an incoming ring signal to a ring detector 164 which actuates a timing generator and power source 166 when a ring signal is detected. The output from the timing generator and power source 166 energizes a relay 168 to close the normally closed contacts 170 and thereby connect a line transformer 172 across the telephone lines to simultate lifting the handset of a telephone. The timing generator and power source 166 also enables a dial detector 174 for a predetermined period of time, such as 30 seconds. The dial detector 174 then detects an incoming additional signal such as the digit nine, and actuates an oscillator 176 to produce a signal from the speaker 178 which is audible to the called party. When the called party lifts the handset from the cradle, contact 180 is closed to permit conversation. An off-hook detector 182, such as that represented by transistor 64, 66 and relay 62 in FIG. 1, detects the closing of cradle switch 180 and resets the timing generator and power source 160 to stop the output of the oscillator 176.

Thus, the system 150 provides a means for intercepting an incoming ring signal before it has disturbed the called party. The absence of a continued ring and the absence of anyone on the line is an announcement signal to the calling party that the system 150 is in operation. By prearranged instructions, the calling party may then transmit an additional signal, such as by dialing the digit nine, or any other suitable signal, to actuate the dial detector 174. Thus, the system 150 permits members of the family, or anyone to whom the additional signal has been given, to reach the called party. A standard signal recognizable by convention established by usage or publication, may be applied to the line as an announcement signal if desired, so that all emergency calls may reach the calling party. The system 150 is less expensive than the system 10 yet performs the functions necessary for screening incoming calls. Yet, unwanted calls do not disturb the called party. It will also be appreciated that the incoming ring signal may be any signal transmitted by the central switching means of the telephone system to a subscriber's unit to indicate an incoming call. This signal is typically an interrupted 20Hz signal which directly drives the subscriber's unit.

While the present invention has been described in connection with a system which can be used in combination with an existing telephone system, it should also be understood that the invention could be employed as an integral part of the entire telephone system and provided as a service to the subscriber.

From the above detailed description of a preferred embodiment of the invention, it will be appreciated that a unique automatic telephone answering device has been described. The device provides a system for intercepting an incoming ring signal so as to prevent the called party from being disturbed. The device provides the means for advising the calling party of the specific activity in which the called party is engaged at the moment. The calling party may then use his judgment as to whether to interrupt the called party. While such a procedure does not prevent the calling party from interrupting the called party in an emergency situation, it does discourage frivolous interruptions such as those made by telephone salesmen and solicitors, and provides friends with information which allows them to use their judgment as to whether to complete the call. In addition, the calling party may be given the option of leaving a returned call or other message. Since the device permits recording an updated announcement, the announcement can indicate that the called party is not at home and indicate that a message may be left, without giving instructions as to how to summon the called party to the telephone.

The device of the present invention is useful in business environments where no one is available to screen calls for executives in conference, or who are otherwise occupied. The device is also particularly suitable for use in the home where an individual does not wish to be disturbed during unusual sleeping hours, during meals or the like. Yet, the device permits emergency calls to reach the home at any time.

Although the preferred ebodiment of the invention has been described in detail, it is to be understood that various changes, substitutions and alterations can be made therein without departing from the spirit and scope of the invention as defined by the appended claims.

What is claimed is:

1. In a system for screening telephone calls, means responsive to an incoming ring signal representing an incoming call for establishing an off-hook condition, means for responding to the caller with a transcribed announcement signal during the off-hook condition, and means responsive to an additional signal transmitted at the option fo the caller during the off-hook condition for signaling the incoming call.

2. The system of claim 1 further characterized by means for preventing the audible ring of the telephone in response to the incoming ring signal.

3. The system of claim 1 wherein the additional signal is a dialed signal.

4. The system of claim 1 further characterized by means for recording a message after the first mentioned means has responded with the recorded announcement in addition to detecting the additional signal.

5. In a system for screening telephone calls, the combination of record means for reproducing a recorded announcement, means responsive to a ring signal for establishing an off-hook condition, for coupling the record means to a telephone line, and for initiating the recorded announcement, means for signaling an incoming call in response to an additional dialed signal from the calling party during the off-hook condition after the recorded announcement has been played, and means for connecting the telephone set to the telephone line in response to the called party answering the telephone in response to the signaled incoming call.

6. The combination of claim 5 further characterized by means for recording a message from the calling party during at least a portion of the time period the off-hook condition is established.

7. In a system for screening telephone calls, the combination of:

announcement recording means for storing an announcement, audio amplifier means for recording on and reproducing from the announcement recording means, transformer means for coupling the device to a telephone line, ring signal detector means for detecting an incoming ring signal and connecting the transformer means to a telephone line in response to an incoming ring signal to produce an off-hook condition;

dial detector means for detecting a signal transmitted by the calling party and initiating a signal to summons the called party, circuit means for transmitting the announcement recorded on the announcement recording means to the telephone line in response to a ring signal being detected by the ring signal detector means, and for coupling the telephone line to the input of the amplifier means and the dial detector to the output of the amplifier means in response to termination of an announcement, and means responsive to the called party answering the telephone for connecting the telephone to the telephone line.

8. The combination of claim 7 further characterized by message recording means, and wherein the circuit means also connects the output of the amplifier means to the message recording means in response to termination of the announcement.

9. In a system for screening telephone calls, means for detecting and terminating an incoming ring signal by establishing an off-hook condition, means responsive to an additional signal transmitted at the option of the calling party during the off-hook condition for indicating an incoming call, means for transmitting a signal to the calling party in response to detection and termination of the ring signal by establishing the off-hook condition, and means for recording a message from the calling party during the off-hook condition and before the additional signal is transmitted.

10. The system of claim 9 wherein the first mentioned means prevents a telephone set from ringing in response to the incoming ring signal.

11. The system of claim 9 wherein the signal transmitted to the calling party comprises means for transmitting a recorded verbal announcement.

12. In a telephone system, the combination of:

means for interconnecting a calling subscriber station and a called subscriber station in response to a request from a calling party and for transmitting a ring signal to the called subscriber station, the called subscriber station comprising means for automatically answering the ring signal by establishing an off-hook condition and responding with a recorded announcement and conditioning the called subscriber station to receive an additional signal dialed form the calling subscriber station without terminating the original call, and means for detecting an additional dialed signal transmitted from the calling subscriber station without terminating the original call and indicating an incoming call at the called subscriber station.

13. The combination of claim 12 wherein the called subscriber station includes:

means for preventing an audible signal in response to the ring signal.

14. The combination of claim 13 wherein the called subscriber station is further characterized by means for recording a message while the means for detecting the additional signal is active.

15. The telephone system comprising:

a plurality of subscriber stations, means operative at the option of a subscriber for responding to a calling subscriber station with an off-hook condition and a recorded announcement indicative of a desire not to be disturbed by a call, and means operative at the option of the calling subscriber to nevertheless continue the call during the off-hook condition without terminating the original call by dialing a second signal from the calling subscriber station.

* * * * *